(12) United States Patent
Smith et al.

(10) Patent No.: US 9,224,257 B2
(45) Date of Patent: Dec. 29, 2015

(54) PAYMENT AUTHORIZED LOCK SYSTEM AND METHODS OF MAKING AND USING THE SAME

(76) Inventors: Kyle Patrick Smith, Leesburg, GA (US); Clay Hall Smith, Leesburg, GA (US)

(*) Notice: Subject to any disclaimer, the term of this patent is extended or adjusted under 35 U.S.C. 154(b) by 628 days.

(21) Appl. No.: 13/544,494

(22) Filed: Jul. 9, 2012

(65) Prior Publication Data
US 2013/0008958 A1 Jan. 10, 2013

Related U.S. Application Data

(60) Provisional application No. 61/571,974, filed on Jul. 8, 2011.

(51) Int. Cl.
*G07B 15/04* (2006.01)
*G07C 9/00* (2006.01)
*G06Q 20/00* (2012.01)
*G06Q 10/02* (2012.01)
*G07C 9/02* (2006.01)
*G06Q 20/04* (2012.01)

(52) U.S. Cl.
CPC ........... *G07C 9/00904* (2013.01); *G06Q 20/00* (2013.01); *G06Q 10/02* (2013.01); *G06Q 20/045* (2013.01); *G07B 15/04* (2013.01); *G07C 9/0069* (2013.01); *G07C 9/02* (2013.01)

(58) Field of Classification Search
CPC ... G06Q 10/02; G06Q 20/341; G06Q 20/045; G06Q 20/105; G07F 7/1008; G07F 15/00
USPC .......................... 235/375, 380, 382
See application file for complete search history.

(56) References Cited

U.S. PATENT DOCUMENTS

| | | | | |
|---|---|---|---|---|
| 5,614,703 | A * | 3/1997 | Martin et al. | 235/382 |
| 5,850,753 | A * | 12/1998 | Varma | 70/278.7 |
| 6,085,976 | A * | 7/2000 | Sehr | 235/384 |
| 6,102,162 | A * | 8/2000 | Teicher | 186/39 |
| 2007/0136127 | A1* | 6/2007 | Li | 705/13 |
| 2008/0154623 | A1* | 6/2008 | Derker et al. | 705/1 |
| 2011/0137773 | A1* | 6/2011 | Davis et al. | 705/34 |

* cited by examiner

*Primary Examiner* — Christopher Stanford
(74) *Attorney, Agent, or Firm* — Withers & Keys, LLC

(57) ABSTRACT

A payment authorized door and/or gate lock system that controls access to a given area through the processing, storage and recollection of data input through a touchscreen user interface.

14 Claims, 12 Drawing Sheets

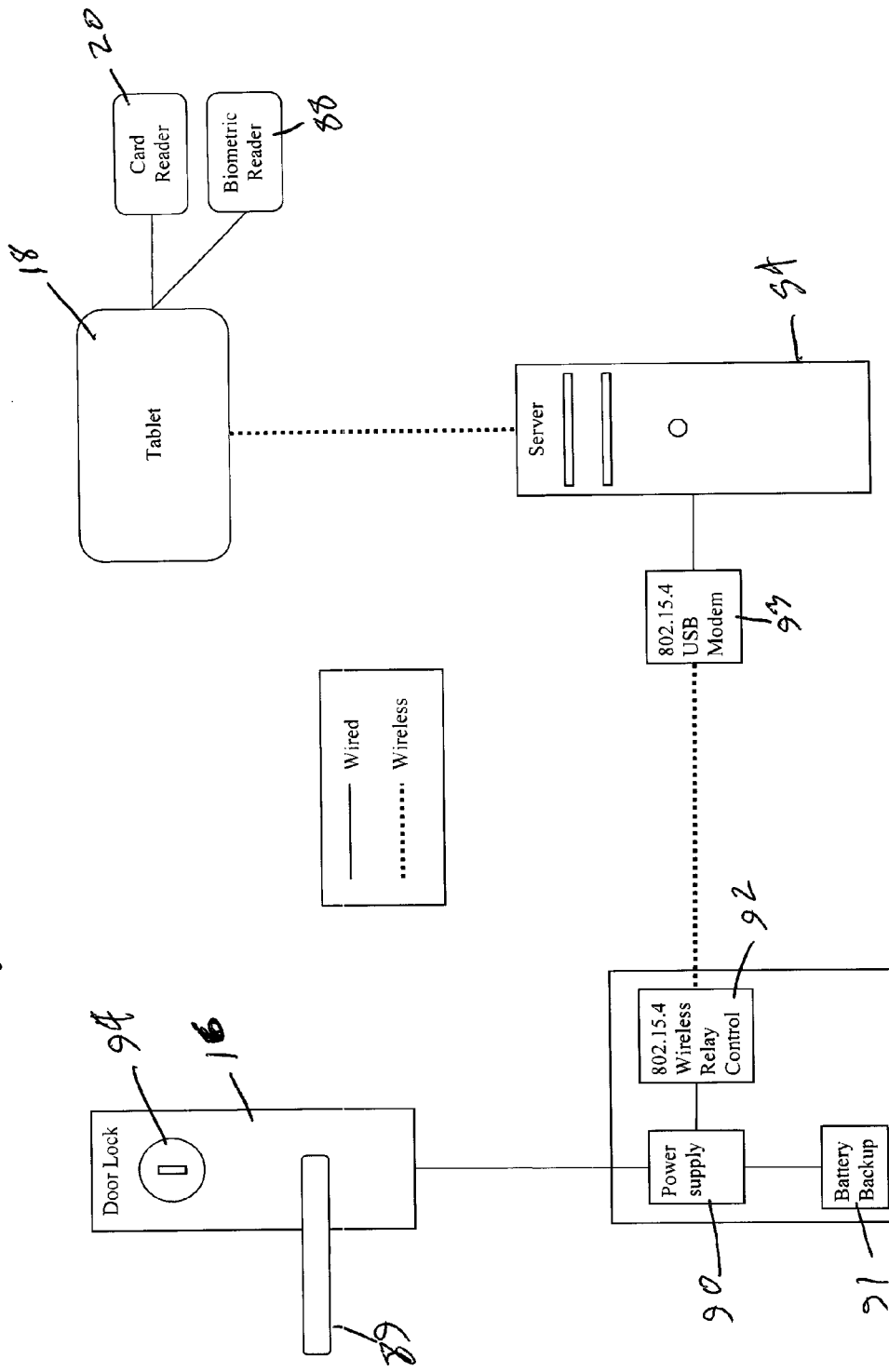

PAYMENT AUTHORIZED LOCK SYSTEM AND METHODS OF MAKING AND USING THE SAME

CROSS-REFERENCE TO RELATED APPLICATIONS

This patent application claims the benefit of priority to U.S. Provisional Patent Application Ser. No. 61/571,974 filed on Jul. 8, 2011 and entitled "PAYMENT AUTHORIZED LOCK SYSTEM", the subject matter of which is hereby incorporated by reference in its entirety.

FIELD OF THE INVENTION

The present invention is directed to door and/or gate locks, such as 'keyless' type electronic doors and/or gate locks that control access to a particular area. The present invention is also directed to kiosk-type devices that perform a function after payment is received via a credit or debit card transaction.

BACKGROUND OF THE INVENTION

Conventional 'keyless' type electronic lock systems require an initial setup, and therefore it is necessary to have someone available to program the lock to allow access for each card, therefore causing operating costs to increase. Most facilities with paid keycard access require an employee to initially input customer information and mode of payment before issuing the keycards that would allow subsequent entry. This data collection and entry is routine, these personal tasks require 24 hour staff for a facility to truly allow 24 hour registration and first time access. Operating budgets at these facilities/buildings could be utilized for other activities if the staff did not have to be present for data entry and keycard setup.

Security is an issue in multiple forms in the conventional 'keyless' system. For one, generic keycards are not given the same concern regarding loss and/or use by other individuals as the level of concern and care a person utilizes with their own credit/debit cards. This lack of concern can lead to unauthorized use by other persons not associated with the card, whether the user voluntarily allowed the use of his/her card or the card was lost or stolen. Unauthorized users create liability concerns along with the increased potential for building and/or equipment damage and loss. Also, in conventional 'keyless' systems when a person uses a credit card, card data security is an issue because somewhere in the process a person and/or employee may be able to see confidential credit and/or debit card data if either of these types of cards are used for payment.

Further, there are multiple devices (kiosks) that perform some function after acceptance of a credit or debit card authorized payment. Some notable current devices that perform operations based on this premise include pay-at-the-pump gas station pumps, movie rental kiosks, pay-for-use copy machines and internet cafes.

SUMMARY OF THE INVENTION

The present invention is directed to an on-site, self-service payment, credit and/or debit card authorized door and/or gate lock system ("locking system") that controls access to a building and/or facility for a set period of time. The access time period would be regulated through the cataloging, indexing and storage of an individual user's information and payment history. In one embodiment, this information would be recalled by the recognition of the magnetic stripe on that individual's credit and/or debit card or by entering a user-specific code. This information could also be recalled by a barcode, which could be either printed or in electronic form on a 'smartphone' type device and then scanned by a barcode reader on the door system. It is intended that the user interface of the present invention will most likely be presented in the form of a 'touchscreen' computer and/or tablet that will guide the individual through a series of screens and prompts before either granting or denying access. This interface will control an electronic door lock that will lock and/or unlock based on both user input, stored information and the information obtained from a third party payment authorization software. The system could be used for one time entry or to setup an extended time of entry (hours, days, months or years) depending on the particular system, use and payment.

In one exemplary embodiment, the door or gate locking system of the present invention comprises a payment card reader for reading a credit card or a debit card; a user interface display for inputting user data therein; a computing system programmed to provide prompts to a user on the user interface display, accept user data inputted into the user interface display and the payment card reader, store inputted user data inputted into the user interface display and the payment card reader, and initiate one or more actions in response to receiving user data; and an electronic lock that changes from (i) a locked configuration to an unlocked configuration or (ii) from an unlocked configuration to a locked configuration in response to a signal generated by the computing system.

The door or gate locking systems of the present invention may further include a number of additional components. Suitable additional components may include, but are not limited to, a sensor for monitoring a number of people that enter through a door or gate locked by the locking system; a keypad separate from or integrally connected to the user interface display; a barcode scanning device separate from or integrally connected to the user interface display; an exit button for placement within a facility locked by the locking system, the exit button enabling unlocking of the electronic lock from inside the facility; a second card reader for placement within a facility locked by the locking system, the second card reader enabling unlocking of the electronic lock from inside the facility; two or more electronic locks, each of which is connected to the computing system so as to change from (i) a locked configuration to an unlocked configuration or (ii) from an unlocked configuration to a locked configuration in response to a signal generated by the computing system; one or more servers having capacity to perform one or more tasks selected from: (i) running the computing system, (ii) storing user inputted data, (iii) providing access to the computing system via a virtual private network, and (iv) providing emails or text messages to a user regarding upcoming events, payment for an event, and changes in scheduling of an upcoming event; and a kiosk for housing the payment card reader and the user interface display.

The present invention is further directed to a payment authorized lockable door or gate. In one exemplary embodiment, the payment authorized lockable door or gate of the present invention comprises (I) a door or gate; and (II) a door or gate locking system comprising a payment card reader for reading a credit card or a debit card; a user interface display for inputting user data therein; a computing system programmed to provide prompts to a user on the user interface display, accept user data inputted into the user interface display and the payment card reader, store inputted user data inputted into the user interface display and the payment card reader, and initiate one or more actions in response to receiving user data; an electronic lock that changes from (i) a locked configuration to an unlocked configuration or (ii) from an unlocked configuration to a locked configuration in response to a signal generated by the computing system; and one or more optional components selected from (1) a sensor for monitoring a number of people that enter through the door or gate locked by the locking system, the computing system further programmed to charge a user's credit card or debit card based on the number of people that enter through the door or gate locked by the locking system; (2) a keypad separate from or integrally connected to the user interface display; (3) a barcode scanning device separate from or integrally connected to the user interface display; (4) an exit button for placement within a facility locked by the locking system, the exit button enabling unlocking of the electronic lock from inside the facility by the user; and (5) a second card reader for placement within a facility locked by the locking system, the second card reader enabling unlocking of the electronic lock from inside the facility by the user; wherein the payment card reader and the user interface display are positioned (i) on the door or gate or (ii) proximate the door or gate.

The present invention is even further directed to methods of making and using door or gate locking systems. In one exemplary embodiment, the method of making a door or gate locking system of the present invention comprises providing a payment card reader for reading a credit card or a debit card; providing a user interface display for inputting user data therein; providing a computing system programmed to provide prompts to a user on the user interface display, accept user data inputted into the user interface display and the payment card reader, store inputted user data inputted into the user interface display and the payment card reader, and initiate one or more actions in response to receiving user data; providing an electronic lock that changes from (i) a locked configuration to an unlocked configuration or (ii) from an unlocked configuration to a locked configuration in response to a signal generated by the computing system; and electronically linking the payment card reader, the user interface display, and the electronic lock with the computing system so as to communicate with one another and perform one or more tasks including locking and unlocking the electronic lock based on user inputted data.

In one exemplary embodiment of using a door or gate locking system of the present invention, the method comprises providing the locking system so that a user may input one or more pieces of data into the locking system via (i) the payment card reader, (ii) the user interface display, or (iii) both the payment card reader and the user interface display; and in response to the user (i) inputting the one or more pieces of data, (ii) authorizing payment of a fee for entry into a facility on a payment card, and (iii) accepting terms of a consent and user agreement, unlocking the electronic lock so as to provide access to the facility.

These and other features and advantages of the present invention will become apparent after a review of the following detailed description of the disclosed embodiments and the appended claims.

BRIEF DESCRIPTION OF THE FIGURES

The present invention is further described with reference to the appended figures showing exemplary embodiments of the present invention, wherein:

FIG. 12 is a schematic view of components in another exemplary door/gate locking system of the present invention.

DETAILED DESCRIPTION OF THE INVENTION

In the following detailed description of the preferred embodiments, reference is made to the accompanying drawings which form a part hereof, and within which are shown by way of illustration specific embodiments by which the invention may be practiced. It is understood that other embodiments may be utilized and structural changes may be made without departing from the scope of the invention.

Turning now to the drawings wherein like numbers refer to like features throughout the drawings, the present invention comprises a payment automated door and/or gate lock system that by controlling the electronic locking and unlocking of a lock controls access to a building and/or facility for a set period of time.

Figure 1:
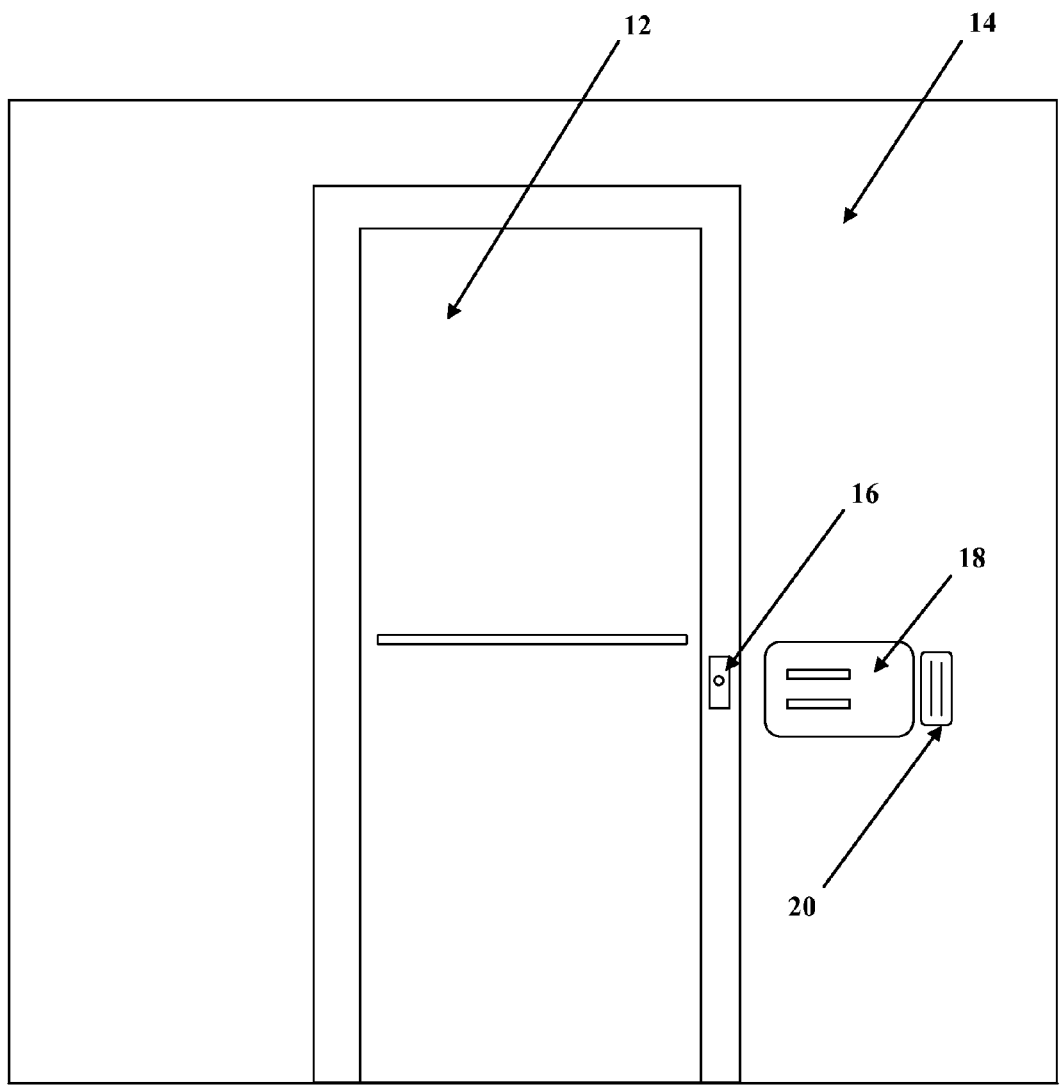
FIG. 1 is a front view of one embodiment of a door/gate lock system of the present invention.

Referring now to the invention in more detail, in FIG. 1 there is shown an outside of a door 12 mounted on a wall 14. The door 12 can be virtually any shape or size and made of a multitude of available materials and be mounted in a multitude of ways to the wall 14. In the preferred embodiment, the door 12 would be of standard size and shape mounted on the standard wall 14 in the standard way in which doors are mounted on walls. In the preferred embodiment the door 12 and wall 14 would be attached to one another with a hinge or pivot point along one side that would allow the door 12 to open and close. On the opposite side of the door 12 from the hinge would be an electronic door lock apparatus 16 whereas the locking mechanism would be actuated by the touchscreen tablet computer 18 mounted on the wall 14 adjacent to the door 12. This electronic door lock apparatus 16 is preferably a prior known solenoid type device that has a circuitry that responds to electric signals.

In the preferred embodiment, the electronic door lock apparatus 16 would be installed in currently known standard manner in place of a standard lock. The touchscreen tablet computer 18 would preferably be positioned on the wall 14 immediately adjacent to the door 12 on which the electronic door lock apparatus 16 is installed. The touchscreen tablet computer 18 would provide the ability for users to input data and to also display information to the user. The touchscreen tablet computer 18 to be used in this present invention can be one of many of the devices currently being produced by manufacturers under the different operating systems that include, but are not limited to, WINDOWS, LINUX, IOS, or ANDROID-based operating systems. Although the mass produced, easy to obtain touchscreen tablet computer 18 would be the preferred device for the input of user data and means to convey information, any device that has the ability to have data input and display information that are currently in use are within the purview of the invention and will be referred to herein as a "touchscreen" or "tablet computer" or any combination thereof. This screen unit could be of varying size, placement and capability.

In further detail, still referring to the invention in FIG. 1, the touchscreen tablet computer 18 would be connected to a general purpose credit card reader 20, also mounted adjacent to the door 12, and this connection could be in any of the current known forms whether directly or wireless. This general purpose credit card reader 20 could be the typical card reader or it could be one of the newer pass-over readers (e.g., Paypass). The touchscreen tablet computer 18 in conjunction with the general purpose credit card reader 20 would work together with any multitude of existing third party credit card authorization software to have the user input data necessary to process and authorize their credit card for payment of entry into the facility regulated by the current invention.

For the purposes of this invention, the term, credit card (also referred to herein as a "payment card"), should be interpreted to be any card including debit cards issued by a bank or other financial institution, as opposed to a specialized keycard issued by a specific facility, that can be used to make a payment. This includes, but is not limited to, those credit and/or debit cards issued by MasterCard, Visa, Discover or American Express. It should also be noted that currently known specialized, encodable keycards could also be used with the present invention, although this would not be preferable due to the security and personnel concerns this invention should help to alleviate. The touchscreen tablet computer 18 will be equipped with the software for controlling the information display, data input, storage and recall needed for the proper operation of the system, which would direct the user through the steps needed in order to gain entry into the building and/or facility.

Figure 2:
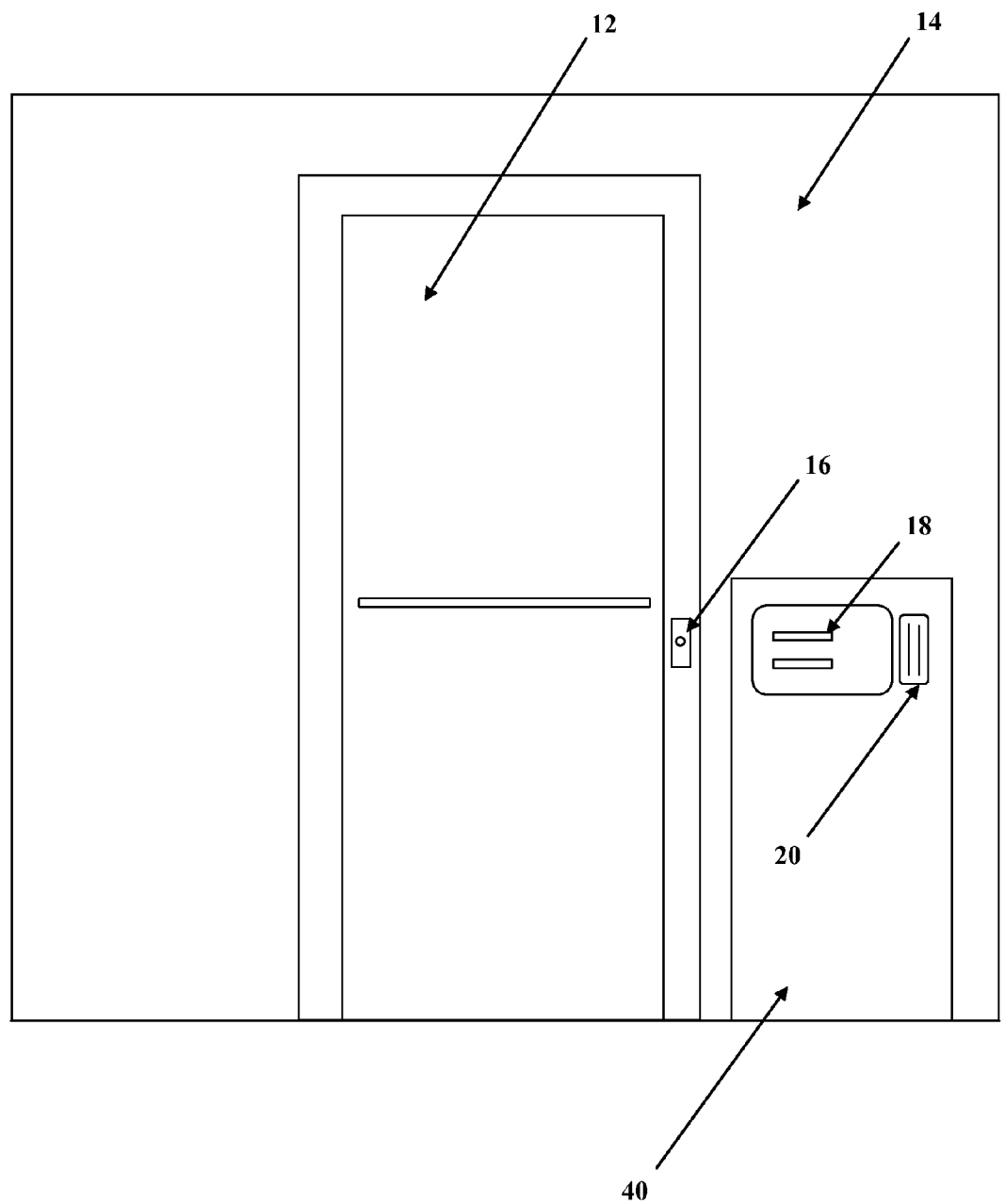
FIG. 2 is a front view of another embodiment of a door/gate lock system of the present invention.
Figure 3:
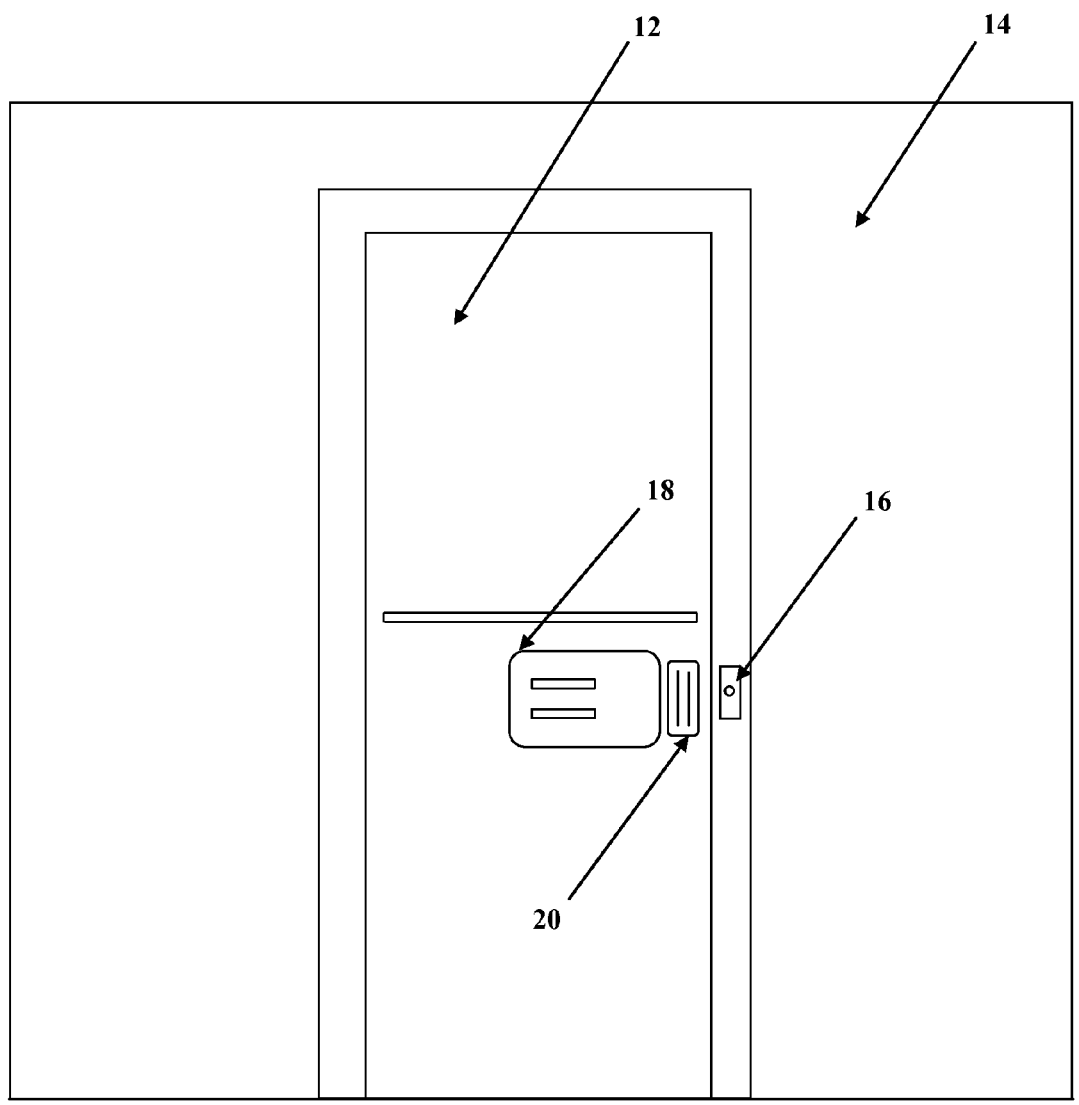
FIG. 3 is a front view of another embodiment of a door/gate lock system of the present invention.

In one embodiment of the present invention, as set forth in FIG. 1, both the touchscreen tablet computer 18 and the general purpose credit card reader 20 would be directly attached to the wall 14 immediately adjacent to the door 12 with the electronic door lock apparatus 16. In another embodiment, and as depicted in FIG. 2, the touchscreen tablet computer 18 and the general purpose credit card reader 20 would be housed in a kiosk type enclosure 40 that could then be mounted in a multitude of known standard ways to either the wall or the ground. This kiosk type enclosure 40 would act as an additional safeguard to help prevent unauthorized tampering or vandalism of the system. This enclosure may be made of virtually any material (fiberglass, metal, plastic, foam, glass or wood) and be of the dimensions sufficient to efficiently contain all the components and wiring of the present invention without limitation, including the computer 18, card reader 20 and any other necessary or optional part of the system. It is intended in this embodiment of the present invention that the kiosk type enclosure 40 would also be weather resistant. In another embodiment, and as depicted in FIG. 3, the touchscreen tablet computer 18 and the generic credit card reader 20 would be directly mounted on the door 12.

Figure 4:
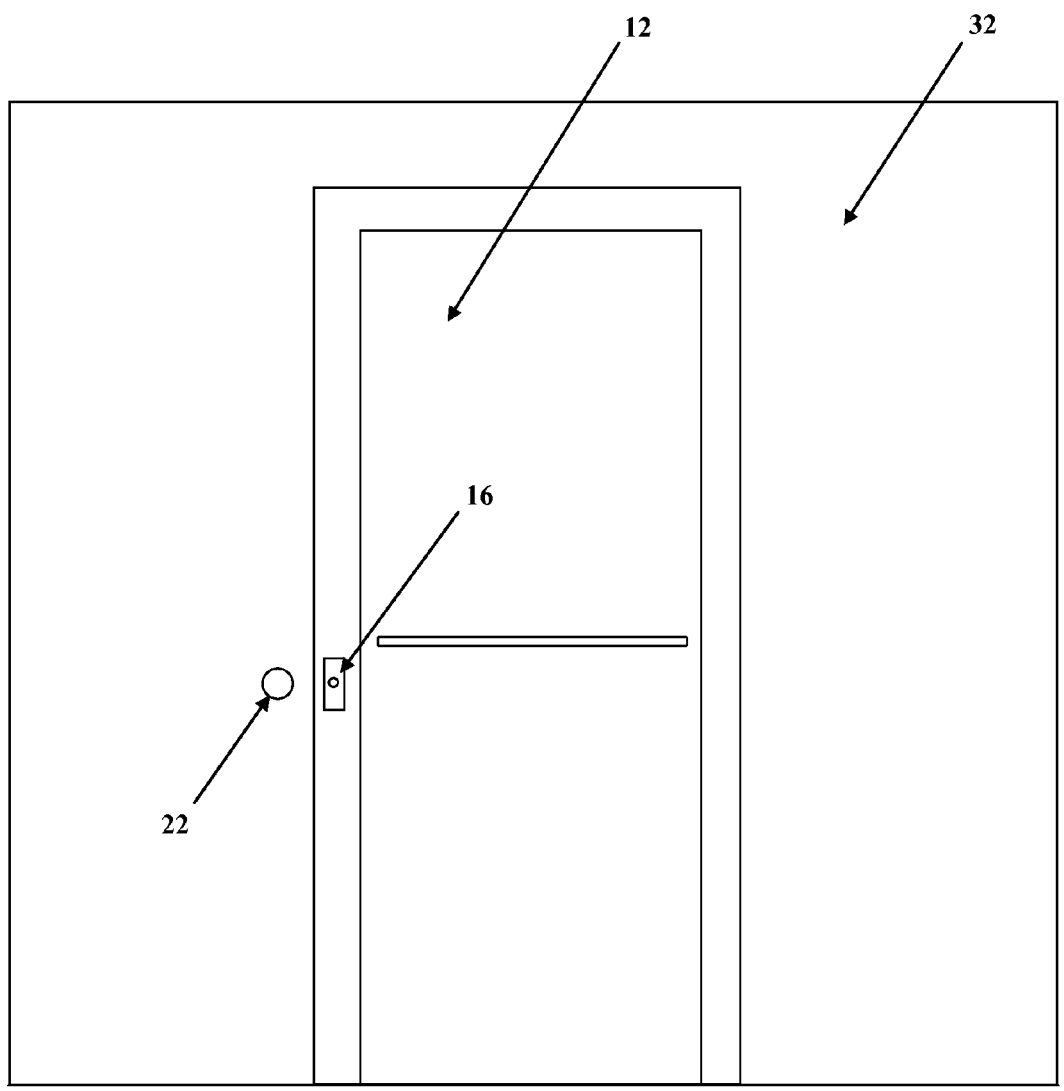
FIG. 4 is a back view of one embodiment of a door/gate lock system of the present invention.

Referring now to the invention shown in FIG. 4 there is shown the inside wall 32 of the building and/or facility with the back (inside) view of the door 12 with the electronic door lock 16. In this back (inside) view embodiment of the current invention an exit button 22 is shown. This exit button 22 would be connected to the touchscreen table computer 18 interface so that when pressed, the computer interface would actuate the electronic door lock 16 to release or unlock. In the current embodiment, the connection between the exit button 22 and the touchscreen table computer 18 could be wired or wireless. In the preferred embodiment the button will be mounted on the wall adjacent to the electronic controlled locked door and would be of sufficient height as to be readily reachable for the average person. The button could be mounted in any number of locations including but not limited to the door, walls, and floor or on a stand-alone mount. The exit button could also be in the form of the door handle or bar itself instead of a separate button as illustrated in FIG. 4.

Figure 5:
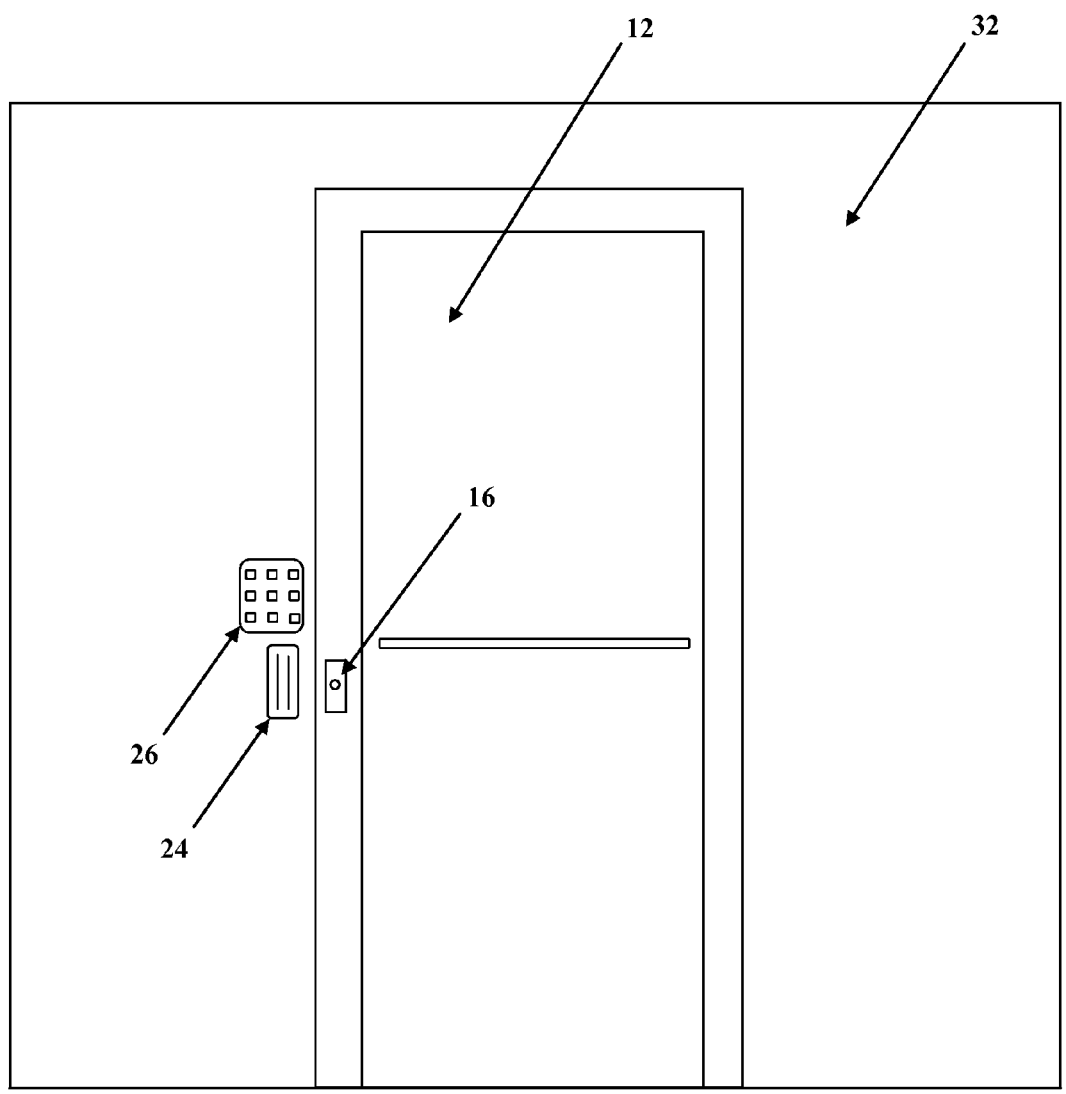
FIG. 5 is a back view of another embodiment of a door/gate lock system of the present invention.

In another embodiment of the back (inside) view as illustrated in FIG. 5, a keypad 26 and another generic credit card reader 24 would take the place of the exit button found in FIG. 4. In this embodiment, the user whom has properly gained access to the facility or building can either enter a predetermined code given upon entry or communicated through other means into the keypad 26 or simply swipe the card used to gain entry through the generic credit card reader 24 and the touchscreen tablet computer 18 containing the operating system interface will recognize the card or code and actuate the electronic door lock to release or unlock, thereby allowing the exit of the user. It should be understood that other embodiments of the present invention could use a different combination of these interior lock release devices than those mentioned. It should also be noted that the door and/or gate lock system could be tied into the alarm system so that the doors may unlock under certain circumstances including but not limited to fire or burglary.

Figure 6:
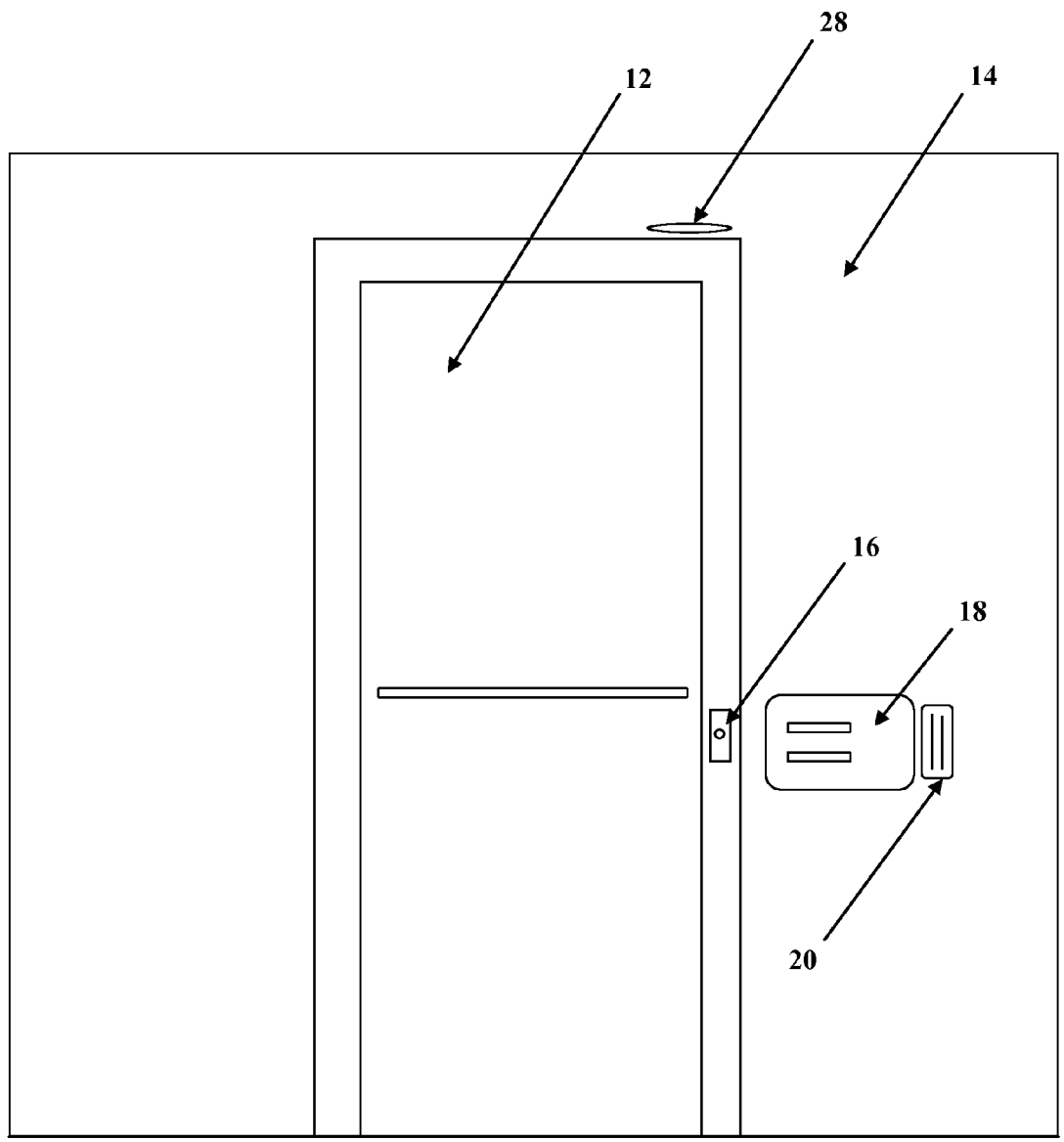
FIG. 6 is a front view of another embodiment of a door/gate lock system of the present invention.

In FIG. 6 the current invention is shown that it may be further equipped with an active and/or passive sensor 28 such as a photosensor, infrared, microwave, or ultrasonic sensor or any combination thereof. The sensor 28 will detect and help monitor entry into the facility or building and therefore should be placed in the doorway and/or gateway. This sensor system should help to prevent dual entry or entry by more than the person and/or persons whom the entry was intended. This component could simply be placed and publicized on the premises to help dissuade abuse, or could actually have the ability built in to the computer interface to cause an additional charge to incur on the person's credit and/or debit card that allowed the additional entrants.

In another simpler embodiment, the system could coexist with a current motion activated camera system in order to help dissuade abuse and prevent dual entry and in order to provide additional security without an operator being present. Although, in FIG. 6 the sensor 28 is shown on the top right and outside of the door, the preferable position would be on the inside of the door so that the sensor would not be exposed as much to outside interference. The position of the sensor 28 could be at any position or location near the door, and should not be limited to just that shown in FIG. 6. The sensor 28 could also be used for the purpose of triggering the door to open if approached from the inside of the building and/or facility. This would function much like those sensors that can be found on gated communities that open the gate without codes or cards when approached from the inside. In the present invention, it is intended that the sensor 28 would interface with the touchscreen tablet computer 18.

Figure 7:
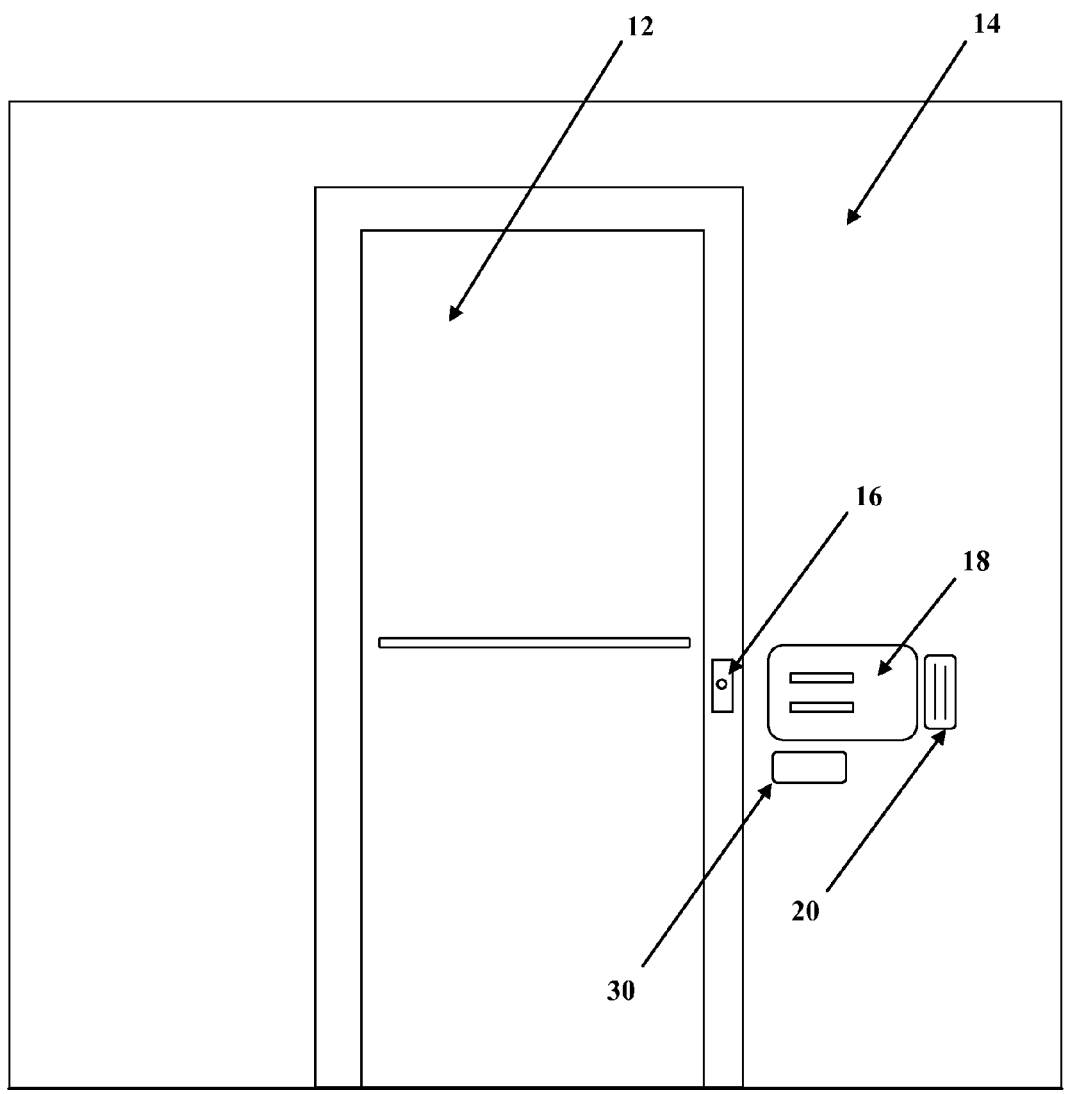
FIG. 7 is a front view of another embodiment of a door/gate lock system of the present invention.

Referring now to the invention shown in FIG. 7, which again shows the outside of the door 12 and the wall 14 with the electronic door lock 16, touchscreen tablet computer 18, generic credit card reader 20, and it also shows the addition of a barcode scanning device 30. In this embodiment the barcode scanning device 30 is shown to be separate from the touchscreen tablet computer 18. However, current, commercially available computers have the ability to scan barcodes without the need for another device, so it is feasible that the barcode scanning device could be a part of the touchscreen tablet computer 18 in another embodiment of the current invention. The barcode scan capability could be used to scan printed (on paper) and electronic (on smartphone type devices) barcodes or electronic signatures. If a barcode is scanned, the corresponding data is sent to the touchscreen tablet computer 18 where it will be used, along with other user inputs, to grant access for an individual into the facility and/or building. These barcodes could be used for temporary promotional events, for the purpose of redeeming discounts and/or offers. Additionally, barcodes could be given and/or sent to the user after the user enrolls and pays online for authorized access to the facility and/or building for a desired amount of time. The barcodes could be given to the user through various means, including but not limited to email, traditional mailings and handouts.

It is important to note that the term "barcode" can refer to any pattern of lines, dots or shapes that represent data by varying the widths, sizes and spacing of these lines and/or shapes and may be referred to as one dimensional or multi dimensional and these patterns can then be recognized to correspond with actual data as is common knowledge. Barcodes include, but are not limited to, any pattern of lines, dots or shapes, QR codes (i.e., quick response codes), and data matrix type codes.

Figure 8:
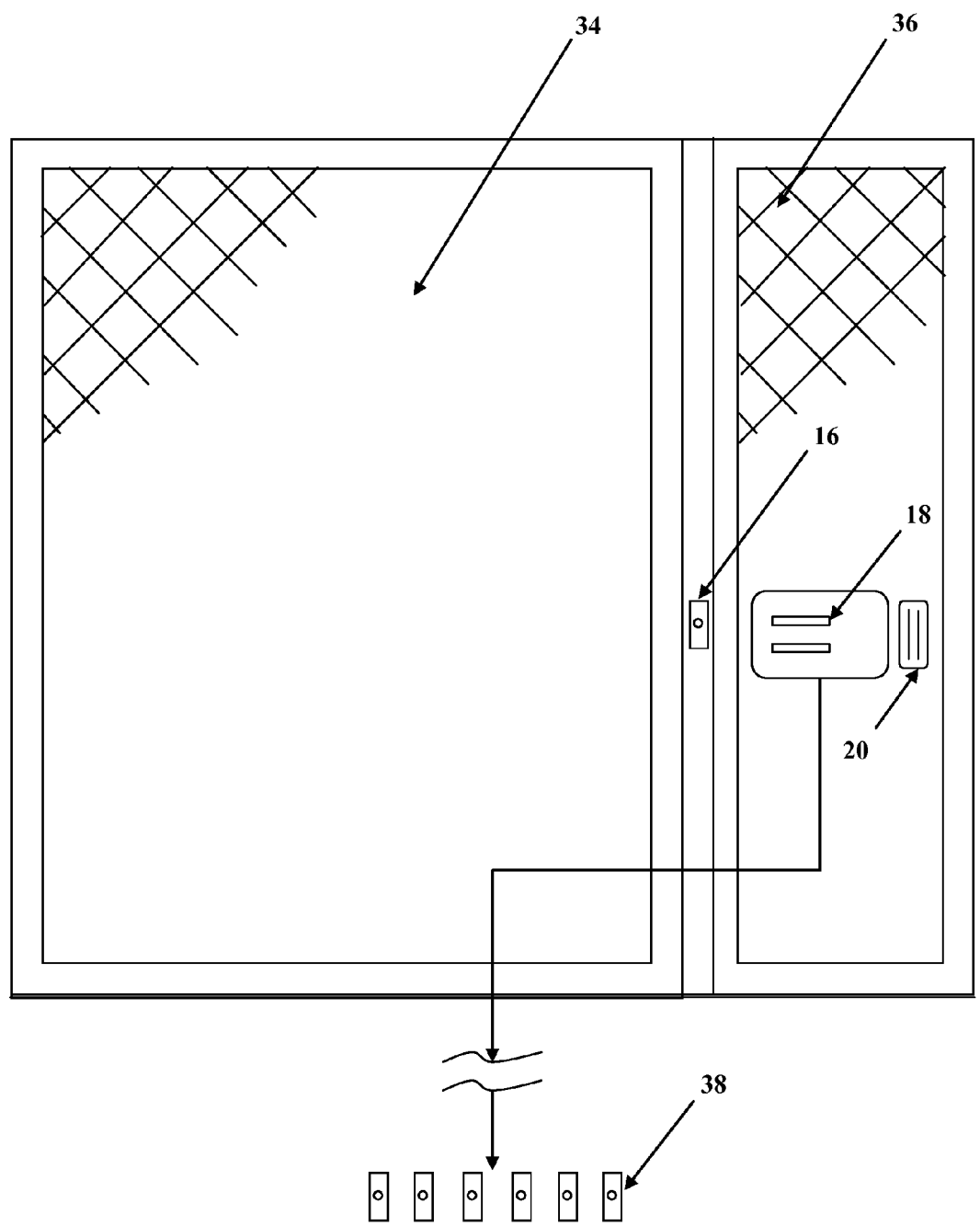
FIG. 8 is a front view of another embodiment of a door/gate lock system of the present invention.

In FIG. 8 the present invention is shown in another embodiment whereas the door 12 in FIGS. 1-7 has been replaced with a gate 34 attached to a fence 36 where the touchscreen tablet computer 18 and generic credit card reader 20 is attached. The electronic door lock apparatus 16 would be installed in currently known standard manner in place of a standard lock either on the gate 34 as shown or on the wall or fence 36 that it is attached. Also in the embodiment of the current invention illustrated in FIG. 8, a plurality of additional electronic door lock apparatuses 38 are illustrated connected to the main touchscreen table computer 18 interface and these locks could be controlled, on an individual lock basis or as a group, in the similar manner as described for the single electronic door lock apparatus 16. These additional electronic door lock apparatuses 38 would be beneficial for a facility that has a shared or communal entry point with many additional separate or individual spaces beyond the shared entry point. An example of a facility that has individually locked spaces which have a shared main entrance and could therefore employ a system as illustrated in FIG. 8 would include but not be limited to, self-storage facilities. Although only an additional six electronic door lock apparatuses 38 have been shown herein as illustrative of the invention, it should be understood that a larger and/or smaller number could be used in an installation, connected in the illustrated fashion, and is within the scope of the current invention.

Figure 9:
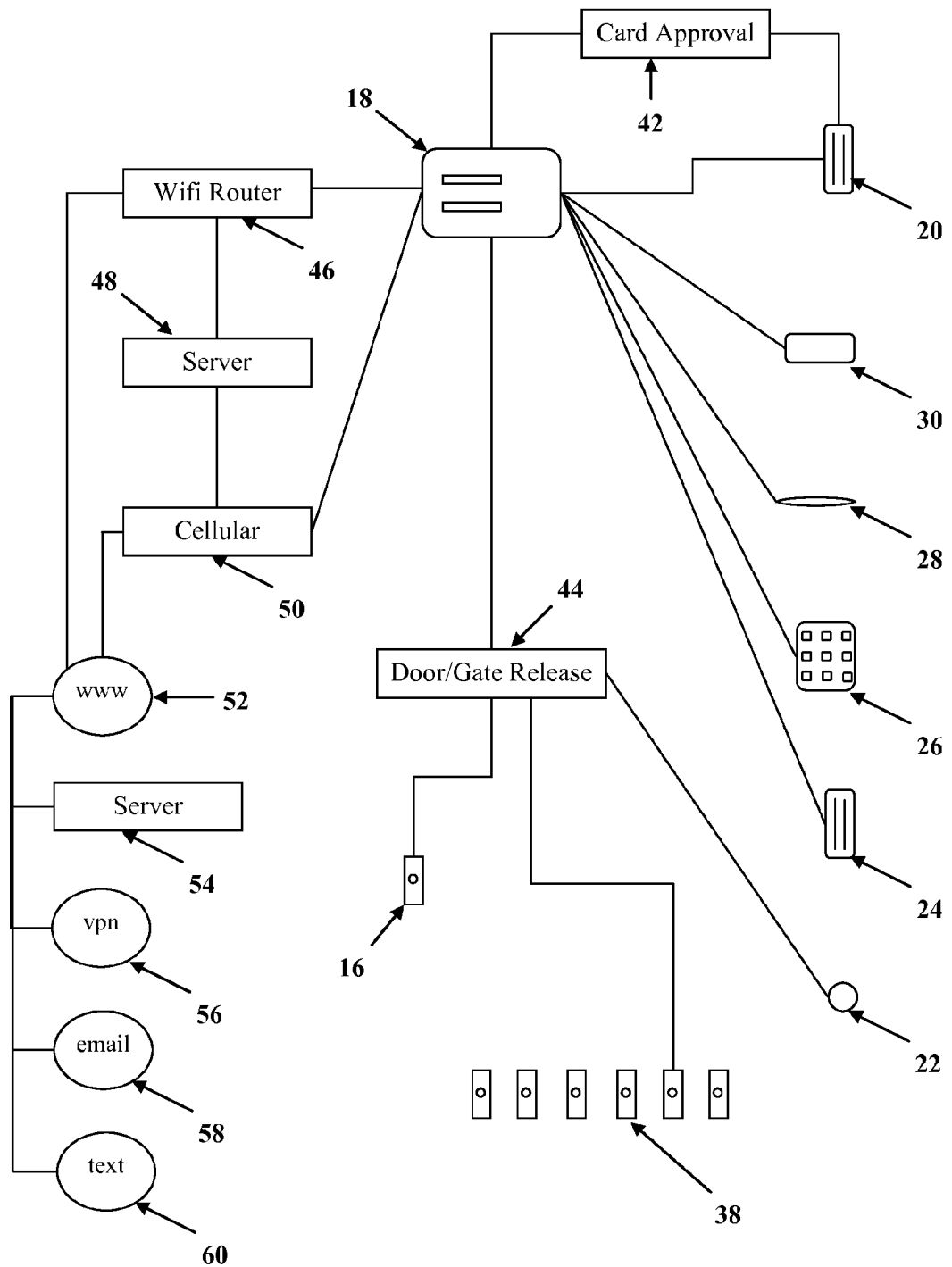
FIG. 9 is a block diagram of a door/gate lock payment authorization system having several alternative paths utilizing the exemplary door/gate lock systems shown in FIGS. 1-8.

Referring now to the block diagram illustrated in FIG. 9 of a door and/or gate lock payment authorization system which has several alternative and/or optional paths embodying the present invention illustrated in FIGS. 1-8 and described herein. This block diagram is primarily presented to show the connections between the different devices that make up the present invention. The connection between devices is mostly electrical, but other means of transmitting information that is known or hereafter developed are within the purview of this invention. At the center of the system would be the touchscreen tablet computer 18 with the operation interface installed. The external devices consisting of the outside generic credit card reader 20, barcode scanner 30, motion detector 28, inside keypad 26, inside credit card reader 24 and inside exit button 22 would all be connected to the computer 18. The computer 18 will process the data from these external devices and the data input into the computer interface itself to determine if it should then actuate the door and/or gate locks, whether they are a single electronic lock apparatus 16 or a plurality of electronic lock apparatuses 38 as described under the different embodiments presented herein. It should be noted that the generic credit card approval process 42 can take several different paths, whether being processed internally or externally from the touchscreen tablet computer 18 and the associated interface, and would still be within the scope of the present invention. It should also be noted that in addition to the barcode scanner 30, virtual keyboard on the touchscreen tablet computer 18, and the generic credit card reader 20 as external input devices, it should be understood that any number of external identification and/or scan type devices could be used. These devices may include currently known devices including but not limited to, biometric readers and smart card readers.

In more detail, still referring to the block diagram of FIG. 9, the part of the system that is not seen by the user is shown on the left hand side of the illustration. This side of the system has many divergent paths that can be utilized in order to accomplish the same goals which include but are not limited to, the ability to store, catalog, recognize, share and recall information. Some of these processes such as the storage of user data and the ability to recognize a previous and/or current user's card data can be either retained on the touchscreen tablet computer 18 itself or be retained within a database located on a server 48 and/or 54. This database server unit can be either a traditional, physical server unit 48 maintained in-house or it may be one of the newer currently known cloud based server 54 systems. The tablet computer interface will be able to communicate with its server counterpart through any of the known technologies including wi-fi 46 or cellular 50, whether these are external or internal to the touchscreen tablet computer 18. The communication abilities attached to the present invention will allow the system to be accessed through the internet 52 via virtual private network (vpn) 56 technologies and also give the system the ability to provide documents, notices and promotions to current and former users through email 58 or text messaging 60. Any other current or future electronic means of communication with the general population would still be within the purview of this invention.

Figure 10:
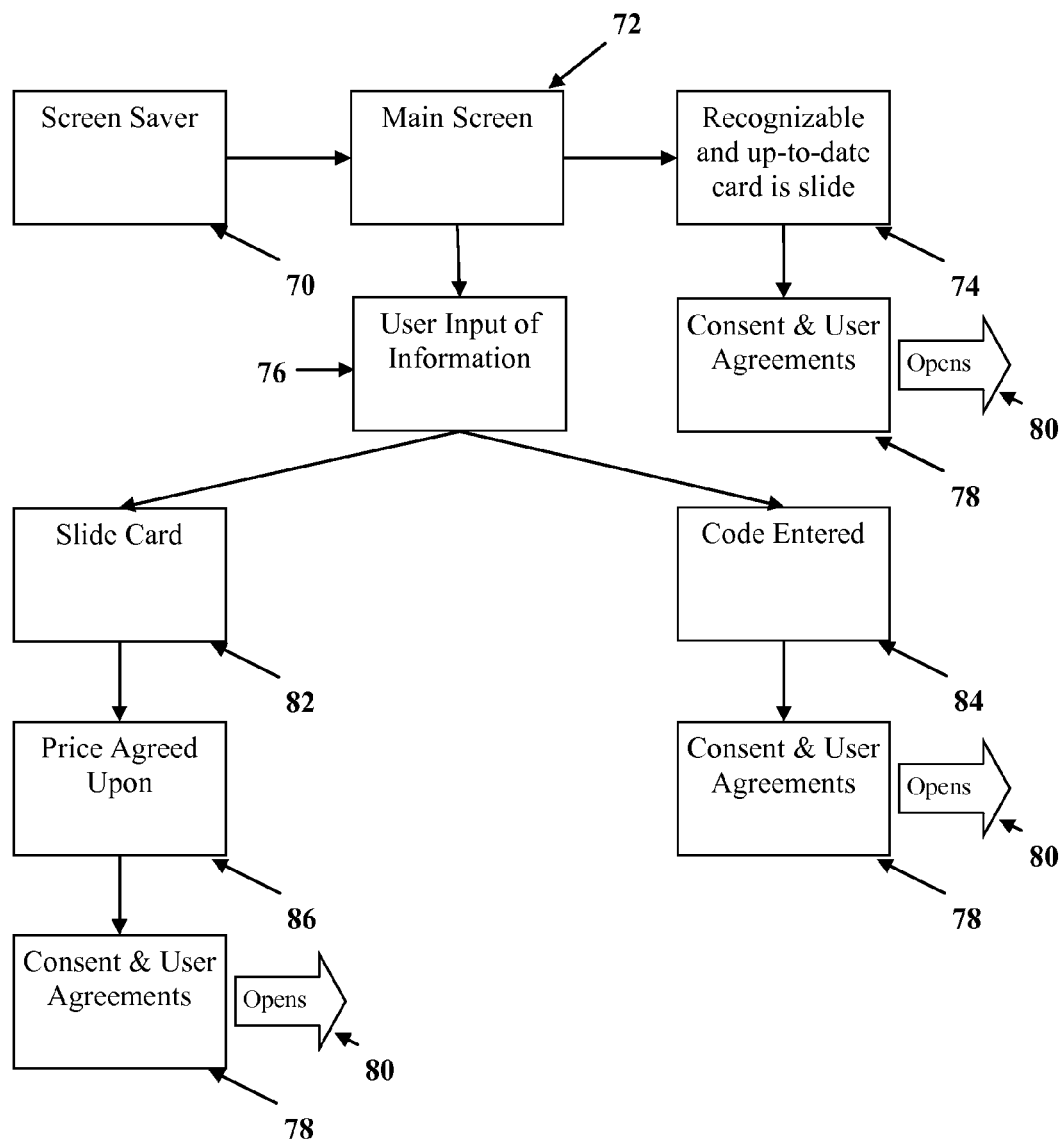
FIG. 10 is a flow diagram of one embodiment of a method of operating a door/gate lock payment authorization system utilizing the exemplary door/gate lock systems shown in FIGS. 1-9.

Another aspect of the present invention is a method for operating the door and/or gate lock payment authorization system illustrated by a flow diagram in FIG. 10. In this embodiment the method shown is to be implemented using the system as illustrated in FIGS. 1-9 and described herein. The flow diagram basically shows one embodiment of a sequence of graphical user interface screenshots that displays information and instructions that a user may need to access the building and/or facility through the system. The preferred embodiment will have the graphical user interface consist of a touchscreen tablet computer 18 for the displaying of information and activation of the electronic locking apparatus 16. The flow diagram begins at the screen saver 70, this screen will be present if the display has been idle for a set period of time. In summary, a potential user would then be directed through a series of on-screen prompts that would eventually involve said person sliding their credit/debit card through an existing card reader, and following approval of the card and various screen prompts, would be granted entry and the door would unlock itself.

In more detail, still referring to the one embodiment of the interface illustrated by the flow diagram of FIG. 10, after the touchscreen device 18 has been activated from the screen saver 70, the user will be presented with a main screen 72 that would ask for the user to input certain user information or to simply slide a credit and/or debit card in the card reader 20. If a recognizable card, one that has been used by the user before on the system and the system can therefore recall the user from, is slide and/or scanned as shown in screenshot 74 then the user would be presented with a customized consent and hold harmless agreement 78 after which the electronic locking apparatus 16 would unlock and the door and/or gate could be opened as shown in step 80 of the flow diagram.

The alternative path from the main screen 72 would require the potential user to input information 76 covering things such as desired time of use and other pertinent information about the user including but not limited to means of contact. At this point the user has the option to enter a code 84 on the touchscreen tablet 18 virtual keyboard if one has been obtained previously through prepayment for access or through promotions, or the user may slide and/or scan their card 82 in order to pay for entry. The computer interface would have the ability to assign codes to individuals who prefer using codes instead of generic credit cards for entry. These codes could be assigned through the interface at the place of business or a separate website affiliated with the system. If a recognizable code is entered 84 then the user would be presented with a customized consent and hold harmless agreement 78 after which the electronic locking apparatus 16 would unlock and the door and/or gate could be opened as shown in step 80 of the flow diagram.

If a card is slide and/or scanned and approved by third party authorization software 42 for payment of the required fee, then the user will agree to this fee 86 and enter any additional information required for the processing of the payment. The user would then be presented with a customized consent and hold harmless agreement 78 after which the electronic locking mechanism 16 would unlock and the door and/or gate could be opened as shown in step 80 of the flow diagram. Those with skill in the art of interface design will recognize that there are numerous combinations and order of steps by which the user can be presented with numerous screens displaying information and requiring input in order to actuate the electronic door lock apparatus 16 from the order and combination described herein without departing from the purview of the invention.

Figure 11:
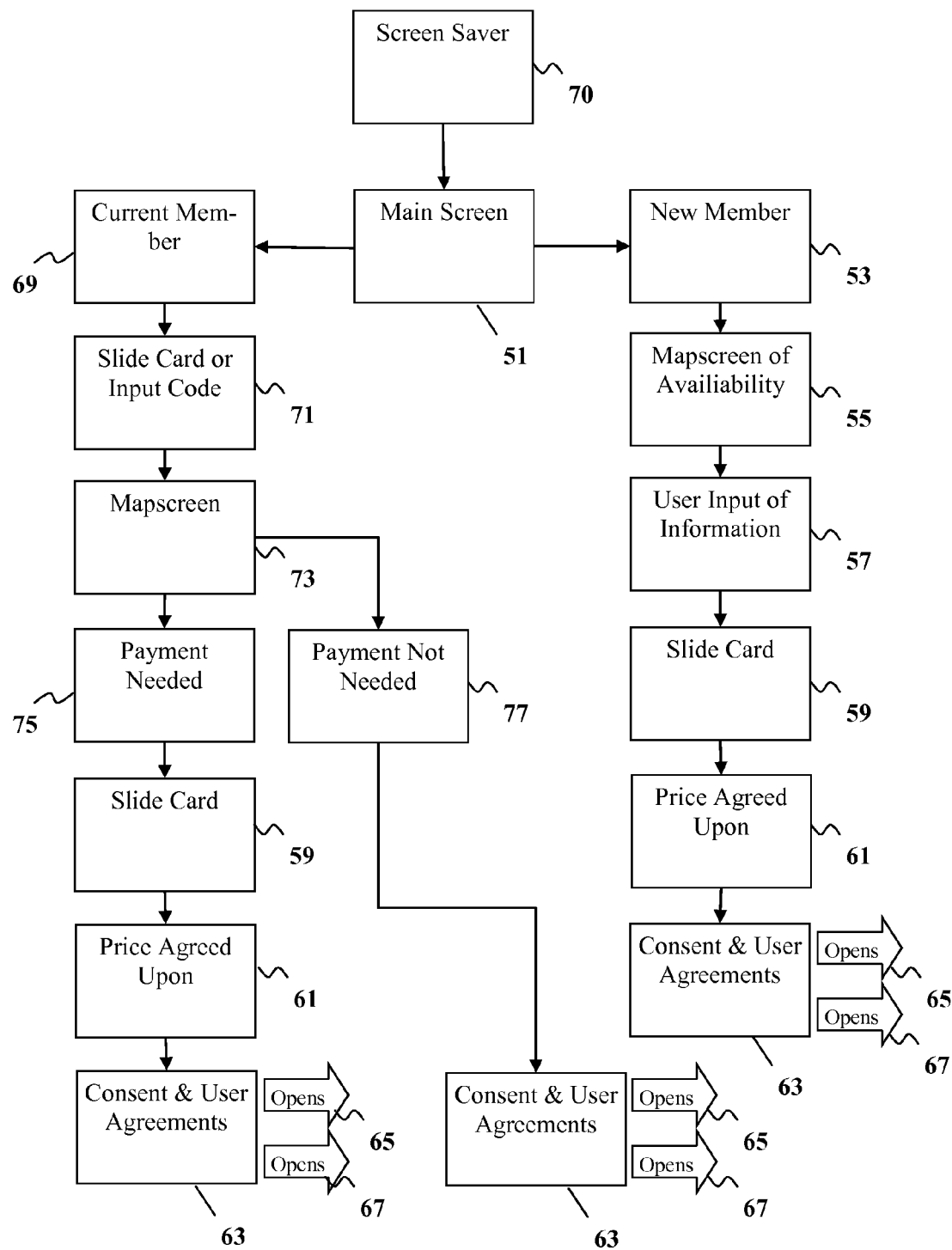
FIG. 11 is a flow diagram of another embodiment of a method of operating a door/gate lock payment authorization system utilizing the exemplary door/gate lock systems shown in FIGS. 1-9.

FIG. 11 is a flow diagram of another embodiment of a method for operating the door and/or gate lock payment authorization system to be implemented using the system as illustrated in FIGS. 1-9 and described herein. This embodiment will have the same preferred graphical user interface that will consist of a touchscreen tablet computer 18 for the displaying of information and actuation of the electronic locking apparatus 16 or plurality of additional electronic door lock apparatuses 38. The computer interface would be able to recognize and correlate credit card line information with the corresponding units and their payment history. This flow diagram also begins at the screen saver 70, this screen will be present if the display has been idle for a set period of time. After the touchscreen device 18 has been activated from the screen saver 70, the user will be presented with a main screen 72 that would ask for the user to input if they are either a current member 69 or a potential new member 53 at which point the screens would diverge into two paths with each path catering to one type of member. The computer interface would be able to recognize and correlate credit cards with the corresponding units.

In further detail of the existing member 69 pathway depicted in the flow diagram of FIG. 11, the current member would either slide a recognizable generic credit card or input a formerly assigned code 71 at which point a screenshot depicting the user's facility and/or building unit on a map 73 of the entire facility. At this point the flowchart would again take two divergent paths depending on if a payment is needed 75 or if a payment is not needed 77. The system interface would have the ability to recognize payment history and past due amounts that will be stored within the system database. If no payment is needed 77 then the then the user would be presented with a customized consent and hold harmless agreement 63 after which the electronic locking apparatus 16 would unlock and the door and/or gate could be opened as shown in step 65 of the flow diagram. If a plurality of electronic locking apparatuses 38 is utilized for the individual units beyond the communal entry point then the electronic locks corresponding to the user could also be unlocked and/or opened at this time as shown in step 67. Referring now in more detail to the alternative path for existing members in FIG. 11, if a payment is needed 75 then the user would be asked to slide a generic credit card 59, enter any necessary information needed to process the card, and agree to the price 61. If the price is agreed upon and the credit card is authorized then the user would be presented with a customized consent and hold harmless agreement 63 after which the electronic locking apparatus 16 would unlock and the main door and/or gate could be opened as shown in step 65 of the flow diagram. If a plurality of electronic locking apparatuses 38 is utilized for the individual units beyond the communal entry point then the electronic locks corresponding to the user could also be unlocked and/or opened at this time as shown in step 67.

In further detail of the new member 53 pathway depicted in the flow diagram of FIG. 11, the new member would view a screenshot depicting the facility and/or building units which are available on a map 55 of the entire facility. From the map screenshot 55 the potential user would choose an available unit, preferably by touching the illustration shown on the map of availability 55 and then input various user information 57. Then the user would be asked to slide a generic credit card 59, enter any necessary information needed to process the card, and agree to the price 61. If the price is agreed upon and the credit card is authorized then the user would be presented with a customized consent and hold harmless agreement 63 after which the electronic locking apparatus 16 would unlock and the main door and/or gate could be opened as shown in step 65 of the flow diagram. If a plurality of electronic locking apparatuses 38 is utilized for the individual units beyond the communal entry point then the electronic locks corresponding to the user could also be unlocked and/or opened at this time as shown in step 67.

As shown in FIG. 12, another exemplary embodiment of the present invention comprises a door or gate locking system comprising electronic locking apparatus 16 with locking mechanism 89 and key hole 94, user interface display (e.g., tablet) 18, card reader 20, biometric (e.g., face recognition) reader 88, server 54, modem 93, wireless relay control 92, power supply (e.g., an AC power supply) 90, and a back-up battery power supply 91. As shown in FIG. 12, the components may communicate with one another via a wired connection, a wireless connection (e.g., wi-fi), or a combination of both a wired connection and a wireless connection. Further, in this embodiment, biometric (e.g., face recognition) reader 88 may be utilized, for example, to verify that the user associated with a given payment card is the actual owner of the payment card. Also, key hole 94 may be used by a facility employee or administrator to mechanically unlock electronic locking apparatus 16 and bypass authorization system described herein.

The advantages of the present invention include, without limitation, is that it lessens the extra operating costs associated with having someone present for the programming of keycards, programmable cards, credit/debit cards and/or payment collection, and it alleviates some of the security concerns of current 'keycard' type locks. It could be used in a wide variety of applications that require monitoring and payment for access to a particular area, and could regulate prepaid and allow paid access to an area 24/7 with the least amount of employee expense and interaction. The system would protect personal and/or card data as soon as it is scanned and/or entered into the system, and it will never be seen by any lower level personnel of the facility. Further, the system would store and catalog the users' data in conjunction with an on-site or off-site database with the ability to export the data for analysis. Further, the interface would display different agreements, consumer use documents, receipts and various promotional items, and would have the ability to send these to the users through email and other electronic means. Further, the system would have the ability to set promotion codes and discount codes that begin and expire after a certain time and/or use frame (tailored to each individual) that would allow entry into the system. Further still, in one embodiment the current invention would be setup with a recurring billing and automatic payment system, which would further reduce operational costs.

In broad embodiment, the present invention is a payment authorized door and/or gate lock system that controls access to a given area through the processing, storage and recollection of data input through a user interface. This system will give a pay-for-use building and/or facility to be fully open for business at any time and level of staffing while still retaining the ability to collect data and secure payment for usage.

In further embodiments of the present invention, the disclosed door or gate locking systems and payment authorized lockable doors or gates of the present invention may comprise one or more of the following components or features:

the addition of a fingerprint scanning and storage option so that entry of an individual into a facility is correlated with a payment card (e.g., a payment card such as a credit card, a debit card, a prepaid card, etc.), after which the individual can gain entry with either (i) the card and/or (ii) fingerprint recognition;

the addition of various other biometric readers and/or software including, but not limited to, facial recognition software that can correlate user information used by the authorized card reader with the user's facial recognition upon first use and either/or can be used to gain access in the future;

the ability for users to change which card is associated with their account (e.g., this can be done independent of assistance from facility personnel, and can be accomplished with email keys that are emailed when a user first uses the system and then can change which card they would like to have associated with their account at any point in the future;

a user interface screen that provides a countdown sequence for the user's view indicating how long the user has to open the door or gate;

the ability of the computing system to set-up monthly recurring billing, with the option to change the billing date;

the ability of the computing system to provide promotion codes that will expire after a set period of time and those that just give certain percentage discounts or free access to a facility;

the ability of the computing system to record entries by a user into the facility without payment;

the ability of the computing system to run continuously and to only be disengaged/stopped by an admin password or keycode;

the ability of a camera on the tablet/input screen/user interface display to take a picture of each entrant and store the picture into a database that can be searched (e.g., this can also be expanded upon to make note through facial recognition code when a user associated with a certain card starts to differ from the user that was previously registered with that card; this should help to cut down on multiple individuals utilizing the same card that has entry rights; this aspect of the present invention can apply to debit/atm/credit cards, as well as 'keycards');

use of the systems at facilities including, but not limited to, as movie theaters, storage facilities, fitness facilities, hotel complexes, office facilities, school facilities, residential facilities and/or houses, etc.;

the ability or a system administrator to make cosmetic changes (e.g., change colors, add logos, text, etc.) and price changes to the system, desirably without having to reprogram the computing system;

the software for the locking system to be portable/downloadable across newly installed systems;

the ability to have motion sensor incorporation into the system;

the ability to store and recall email and customer information;

the ability of a user to sign-up for membership via a website using information that can be accessed and utilized by the computing system of the actual electronic door locking system and door/gate;

barcode recognition ability from, e.g., a smartphone;

the ability to provide the user with a receipt (e.g., a physical receipt) either showing membership good till a given date and/or an amount billed that day, as well as the ability to provide the user with an electronic receipt emailed with the user agreement if a user email address is entered into the computing system;

server based communication for data storage in either a physical or cloud-based server system;

code used to program the computing system to be visible (open) to a system administrator for future improvements/modifications/additions;

the ability to set maintenance/supervisor codes for entry into the facility without payment and the ability to change these codes (e.g., in order to deal with a change of employees, etc.);

button or sensor inside the facility that temporarily disengages the door lock;

the ability to set discounts to be given to users that utilize the facility a certain number of times;

the ability to control the door system remotely;

the ability to input existing member data or payment data that existed before the installation of a given door system;

the ability to export system data (e.g., the number of entrants, emails, payments, time and date data) for outside data crunches;

the ability to set promotion codes that expire after a certain time frame (i.e., tailored to each individual) that would allow entry into the system without payment (e.g., the promotional code entry would also prompt a screen that would require the user to enter information that could be used for later promotional purposes);

the ability to make the application run at all times (e.g., have a screen saver feature) and not be able to shut down from unauthorized users;

the ability to utilize a touchscreen (or other user interface device) that has a well-known or common operating system, such as, for example, WINDOWS, LINUX, IOS, or ANDROID-based operating systems;

the ability of a user to pick a desired facility or unit within a building or facility that the user desires access to via a visual display of the facility on the user interface display;

the ability to send emails to users that frequent the facility when the user's normal pattern is not detected to prevent fraud and encourage use;

the ability to send "alarms" set by user to remind them to use and or make payment;

the ability to provide website interaction for the user including, but not limited to, setting calendars or schedules where the user can pick and choose what days and/or for what times he/she needs or desires access; and the ability for the system to send reminders to users regarding desired times/schedules/activities whenever the desired times/schedules/activities become available.

Other Embodiments:

1. A door or gate locking system comprising: a payment card reader for reading a credit card or a debit card; a user interface display for inputting user data therein (e.g., a computer display, a touchscreen, an iPad screen, a system with audio and/or audio exchange between a facility administrator and the user, etc.); a computing system programmed to provide prompts to a user on the user interface display, accept user data inputted into the user interface display and the payment card reader, store inputted user data inputted into the user interface display and the payment card reader, and initiate one or more actions in response to receiving user data; and an electronic lock that changes from (i) a locked configuration to an unlocked configuration or (ii) from an unlocked configuration to a locked configuration in response to a signal generated by the computing system.

2. The door or gate locking system of embodiment 1, wherein the computing system is further programmed to recognize current members based on (i) stored inputted user data previously inputted on the user interface display, the payment card reader data, via a website on the Internet or a server, or any combination thereof, and (ii) a code entered by the user on the user interface display or a payment card read by the payment card reader.

3. The door or gate locking system of embodiment 1 or 2, wherein the computing system is further programmed to (1) recognize current members based on (i) stored inputted user data previously inputted on the user interface display, the payment card reader data, or both the user interface display and the payment card reader, and (ii) a code entered by the user on the user interface display or a payment card read by the payment card reader, and (2) automatically charge the current member's payment card a price per person for entry through a door or gate locked by the locking system provided that the current user has authorized the locking system to do so, and such authorization is within the stored inputted user data for the current member.

4. The door or gate locking system of any one of embodiments 1 to 3, wherein the computing system is further programmed to (i) display a price per person on the user interface display for entry through a door or gate locked by the locking system, and (ii) in response to price acceptance data inputted by the user on the user interface display, sending a signal to the electronic lock to unlock the electronic lock.

5. The door or gate locking system of any one of embodiments 1 to 4, wherein the computing system is further programmed to (i) accept or decline payment by a user using a payment card, and (ii) in response to accepting payment, sending a signal to the electronic lock to unlock the electronic lock, and (iii) in response to declining payment, providing a message or prompt to the user via the user interface display.

6. The door or gate locking system of any one of embodiments 1 to 5, wherein the computing system is further programmed to (i) accept or decline payment by a user using a payment card, and (ii) in response to accepting payment, providing a consent and user agreement for the user to review on the user interface display, and (iii) in response to the user accepting terms of the consent and user agreement via input into the user interface display, sending a signal to the electronic lock to unlock the electronic lock, and (iv) in response to the user not accepting terms of the consent and user agreement, providing a message or prompt to the user via the user interface display.

7. The door or gate locking system of any one of embodiments 1 to 6, further comprising a sensor for monitoring a number of people that enter through a door or gate locked by the locking system, the computing system further programmed to charge a user's credit card or debit card based on the number of people that enter through the door or gate locked by the locking system.

8. The door or gate locking system of any one of embodiments 1 to 7, further comprising a keypad, the keypad being separate from the user interface display or integrally connected to the user interface display.

9. The door or gate locking system of any one of embodiments 1 to 8, further comprising a barcode scanning device, the barcode scanning device being separate from the user interface display or integrally connected to the user interface display, the barcode scanning device being capable of reading barcode data for processing by the computing system.

10. The door or gate locking system of any one of embodiments 1 to 9, further comprising an exit button for placement within a facility locked by the locking system, and wherein the computing system, in response to a user pressing the exit button, sends a signal to the electronic lock to unlock the electronic lock.

11. The door or gate locking system of any one of embodiments 1 to 9, further comprising a second card reader for placement within a facility locked by the locking system, and wherein the computing system, in response to a user contacting or swiping (e.g., not contacting but coming into close proximity thereto) the second card reader with a user card, sends a signal to the electronic lock to unlock the electronic lock.

12. The door or gate locking system of any one of embodiments 1 to 11, further comprising two or more electronic locks, each of which is connected to the computing system so as to change from (i) a locked configuration to an unlocked configuration or (ii) from an unlocked configuration to a locked configuration in response to a signal generated by the computing system.

13. The door or gate locking system of any one of embodiments 1 to 12, further comprising one or more servers, the one or more servers having capacity to perform one or more tasks selected from: (i) running the computing system, (ii) storing user inputted data, (iii) providing access to the computing system via a virtual private network, and (iv) providing emails or text messages to a user regarding upcoming events, payment for an event, and changes in scheduling of an upcoming event.

14. The door or gate locking system of any one of embodiments 1 to 13, wherein the computing system is accessible from a remote location via an electronic device.

15. The door or gate locking system of any one of embodiments 1 to 14, wherein the computing system is accessible from a remote location via an electronic device, the electronic device comprising a computer, a cellular phone, a smart phone, or a computer tablet (or any other device, e.g., any handheld device, having Internet access).

16. The door or gate locking system of any one of embodiments 1 to 15, wherein the payment card reader and the user interface display are within a kiosk positioned on, in (e.g., using a smartglass such as those commercially available from Corning) or proximate a door or gate locked by the locking system.

17. A door or gate comprising the door or gate locking system of any one of embodiments 1 to 16.

18. The door or gate of embodiment 17, wherein the payment card reader and the user interface display are positioned (i) on the door or gate or (ii) proximate the door or gate.

19. A payment authorized lockable door or gate comprising: (I) a door or gate; and (II) a door or gate locking system comprising: a payment card reader for reading a credit card or a debit card; a user interface display for inputting user data therein; a computing system programmed to provide prompts to a user on the user interface display, accept user data inputted into the user interface display and the payment card reader, store inputted user data inputted into the user interface display and the payment card reader, and initiate one or more actions in response to receiving user data; an electronic lock that changes from (i) a locked configuration to an unlocked configuration or (ii) from an unlocked configuration to a locked configuration in response to a signal generated by the computing system; and one or more optional components selected from (1) a sensor for monitoring a number of people that enter through the door or gate locked by the locking system, the computing system further programmed to charge a user's credit card or debit card based on the number of people that enter through the door or gate locked by the locking system; (2) a keypad, the keypad being separate from the user interface display or integrally connected to the user interface display; (3) a barcode scanning device, the barcode scanning device being separate from the user interface display or integrally connected to the user interface display, the barcode scanning device being capable of reading barcode data for processing by the computing system; (4) an exit button for placement within a facility locked by the locking system, and wherein the computing system, in response to a user pressing the exit button, sends a signal to the electronic lock to unlock the electronic lock; and (5) a second card reader for placement within a facility locked by the locking system, and wherein the computing system, in response to a user contacting or swiping (e.g., not contacting but coming into close proximity thereto) the second card reader with a user card, sends a signal to the electronic lock to unlock the electronic lock; wherein the payment card reader and the user interface display are each independently positioned (i) on the door or gate or (ii) proximate the door or gate.

20. A method of using the door or gate locking system of any one of embodiments 1 to 16, the method comprising: providing the locking system so that a user may input one or more pieces of data into the locking system via (i) the payment card reader, (ii) the user interface display, or (iii) both the payment card reader and the user interface display; and in response to the user (i) inputting the one or more pieces of data, (ii) authorizing payment of a fee for entry into a facility on a payment card, and (iii) accepting terms of a consent and user agreement, unlocking the electronic lock so as to provide access to the facility.

It should be understood that although the above-described door or gate locking systems, payment authorized lockable doors or gates, and methods of making and using the same are described as "comprising" one or more components or steps, the above-described door or gate locking systems, payment authorized lockable doors or gates, and methods may "comprise," "consists of," or "consist essentially of" the above-described components or steps of the door or gate locking systems, payment authorized lockable doors or gates, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains"; "containing," "characterized by" or any other variation thereof, are intended to encompass a non-exclusive inclusion, subject to any limitation explicitly indicated otherwise, of the recited components. For example, a door or gate locking system, a payment authorized lockable door or gate, or method that "comprise" a list of elements (e.g., components or steps) is not necessarily limited to only those elements (or components or steps), but may include other elements (or components or steps) not expressly listed or inherent to the door or gate locking system, the payment authorized lockable door or gate, or the method.

As used herein, the transitional phrases "consists of" and "consisting of" exclude any element, step, or ingredient not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a door or gate locking system, a payment authorized lockable door or gate, or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described door or gate locking systems, payment authorized lockable doors or gates, or methods may comprise, consist essentially of, or consist of any of the herein-described components and features, as shown in the figures with or without any feature(s) not shown in the figures. In other words, in some embodiments, the door or gate locking systems, payment authorized lockable doors or gates, or methods of the present invention do not have any additional features other than those shown in the figures, and such additional features, not shown in the figures, are specifically excluded from the door or gate locking systems, payment authorized lockable doors or gates, and methods. In other embodiments, the door or gate locking systems, the payment authorized lockable doors or gates, and the methods of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

Exemplary door or gate locking systems, payment authorized lockable doors or gates, and methods of using the exemplary door or gate locking systems of the present invention, such as those detailed in FIGS. 1-12 and described above, were prepared and utilized to provide limited access to a fitness facility.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A door or gate locking system comprising:
   a payment card reader for reading a payment card;
   a user interface display for inputting user data therein;
   a computing system programmed to provide prompts to a user on said user interface display, accept user data inputted into said user interface display and said payment card reader, store inputted user data inputted into said user interface display and said payment card reader, and initiate one or more actions in response to receiving user data;
   an electronic lock that changes from (i) a locked configuration to an unlocked configuration or (ii) from an unlocked configuration to a locked configuration in response to a signal generated by said computing system; and
   a door or gate locked by said locking system, said door or gate being sized so that one or more persons can enter through the door or gate and into a facility having restricted access via the door or gate;
   wherein said computing system is further programmed to (i) accept or decline payment by a user using a payment card, and (ii) in response to accepting payment, providing a consent and user agreement for the user to review on said user interface display, and (iii) in response to the user accepting terms of the consent and user agreement via input into said user interface display, sending a signal to said electronic lock to unlock said electronic lock, and (iv) in response to the user not accepting terms of the consent and user agreement, providing a message or prompt to the user via said user interface display.

2. The door or gate locking system of claim 1, wherein said computing system is further programmed to recognize current members based on (i) stored inputted user data previously inputted on said user interface display, said payment card reader data, via an Internet website or a local server webpage, or any combination thereof, and (ii) a code entered by the user on said user interface display or a payment card read by said payment card reader.

3. The door or gate locking system of claim 2, wherein said computing system is further programmed to (1) recognize current members based on (i) stored inputted user data previously inputted on said user interface display, said payment card reader data, or both said user interface display and said payment card reader, and (ii) a code entered by the user on said user interface display or a payment card read by said payment card reader, and (2) automatically charge the current member's payment card a price per person for entry through the door or gate locked by said locking system provided that the current user has authorized said locking system to do so, and such authorization is within the stored inputted user data for the current member.

4. The door or gate locking system of claim 3, wherein said computing system is further programmed to (i) display a price per person on said user interface display for entry through the door or gate locked by said locking system, and (ii) in response to price acceptance data inputted by the user on said user interface display, sending a signal to said electronic lock to unlock said electronic lock.

5. The door or gate locking system of claim 1, further comprising a sensor for monitoring a number of people that enter through the door or gate locked by said locking system, said computing system further programmed to charge a user's payment card based on the number of people that enter through the door or gate locked by said locking system as determined by the sensor.

6. The door or gate locking system of claim 1, further comprising a keypad, said keypad being separate from said user interface display or integrally connected to said user interface display.

7. The door or gate locking system of claim 1, further comprising a barcode scanning device, said barcode scanning device being separate from said user interface display or integrally connected to said user interface display, said barcode scanning device being capable of reading barcode data for processing by said computing system.

8. The door or gate locking system of claim 1, further comprising an exit button for placement within a facility locked by said locking system, and wherein said computing system, in response to a user pressing said exit button, sends a signal to said electronic lock to unlock said electronic lock.

9. The door or gate locking system of claim 1, further comprising a second card reader for placement within a facility locked by said locking system, and wherein said computing system, in response to a user contacting said second card reader with a user card or bring the user card into close proximity to said second card reader, sends a signal to said electronic lock to unlock said electronic lock.

10. The door or gate locking system of claim 1, further comprising two or more electronic locks, each of which is connected to said computing system so as to change from (i)

a locked configuration to an unlocked configuration or (ii) from an unlocked configuration to a locked configuration in response to a signal generated by said computing system.

11. The door or gate locking system of claim 1, further comprising one or more servers, said one or more servers having capacity to perform one or more tasks selected from: (i) running said computing system, (ii) storing user inputted data, (iii) providing access to said computing system via a virtual private network, and (iv) providing emails or text messages to a user regarding upcoming events, payment for an event, and changes in scheduling of an upcoming event.

12. The door or gate locking system of claim 1, wherein said computing system is accessible from a remote location via an electronic device.

13. The door or gate of claim 1, wherein said payment card reader and said user interface display are each independently positioned (i) on the door or gate or (ii) proximate said door or gate.

14. A method of using the door or gate locking system of claim 1, said method comprising:
   providing the locking system so that a user may input one or more pieces of data into the locking system via (i) the payment card reader, (ii) the user interface display, or (iii) both the payment card reader and the user interface display; and
   in response to the user (i) inputting the one or more pieces of data, (ii) authorizing payment of a fee for entry into a facility on a payment card, and (iii) accepting terms of a consent and user agreement, unlocking the electronic lock so as to provide access to the facility.

\* \* \* \* \*